United States Patent [19]
Kaneda et al.

[11] Patent Number: 5,833,313
[45] Date of Patent: Nov. 10, 1998

[54] AUTOMOTIVE SEAT

[75] Inventors: Takuji Kaneda; Masaaki Yasuda; Eiji Masutani, all of Tochigi-ken; Kazutomo Isonaga; Satoshi Hayashi, both of Saitama, all of Japan

[73] Assignees: Tokyo Seat Co., Ltd.; Honda Giken Kogyo Kabushiki Kaisha, both of Japan

[21] Appl. No.: 774,057

[22] Filed: Dec. 23, 1996

[30] Foreign Application Priority Data

Dec. 29, 1995 [JP] Japan ................................. 7-354345

[51] Int. Cl.⁶ .......................... A47C 31/00; A47C 31/02
[52] U.S. Cl. ................................. 297/218.1; 297/219.1; 297/228.1; 297/228.13; 297/218.3; 297/452.38; 297/452.59; 297/452.62
[58] Field of Search ........................ 297/218.1, 218.2, 297/218.3, 218.5, 219.1, 228.13, 228.1, 225, 228, 452.38, 452.59, 223, 452.62, 452.48

[56] References Cited

U.S. PATENT DOCUMENTS

| | | | |
|---|---|---|---|
| 2,135,657 | 11/1938 | Church | 297/218.2 |
| 3,804,457 | 4/1974 | Hellman . | |
| 4,296,964 | 10/1981 | Haack | 297/218.1 |
| 4,789,201 | 12/1988 | Selbert | 297/218.1 |
| 4,861,104 | 8/1989 | Malak | 297/218.3 |
| 5,477,572 | 12/1995 | Weingartner et al. | 297/452.48 |

FOREIGN PATENT DOCUMENTS

2562055  10/1995  France ........................ 297/452.59

*Primary Examiner*—Peter M. Cuomo
*Assistant Examiner*—Anthony D. Barfield
*Attorney, Agent, or Firm*—Dann, Dorfman, Herrell and Skillman, P.C.

[57] ABSTRACT

An automotive seat comprises a seat back and a seat cushion, the seat cushion having a cushioned padding, a covering sheet covering front and middle sections of the cushioned padding, sides cover covering both side sections of the cushioned padding, and a back cover covering a rear section of the cushioned padding, the back cover formed into a predetermined three-dimensional shape utilizing a sheet of fiber impregnated with thermoelastic synthetic resin, the back cover having a body of a substantially C-shape in section and mounting sections provided at both sides of the C-shaped body, each of the mounting sections laminated with a sheet of hard felt serving as a reinforcement and having a through-hole, each of the side covers including a fastener having a body of a substantially square pole-shape projecting forwardly from a front surface of a rear section of the side cover and a pair of stopper pawls, said back covers disposed arranged between the side covers and secured to the side covers by causing fasteners to be press-fitted through through-holes of the mounting sections of the back cover, a terminal of the covering sheet sewed to an edge of an upper section of the C-shaped body of the back cover.

14 Claims, 6 Drawing Sheets

AUTOMOTIVE SEAT

BACKGROUND OF THE INVENTION

1. Field of the Invention

This invention relates to an improvement of an automotive seat comprising a seat back and a seat cushion, and more particularly to an improvement of a back cover for covering a rear section of a cushioned padding for the seat cushion.

2. Description of the Prior Art

Figure 1:
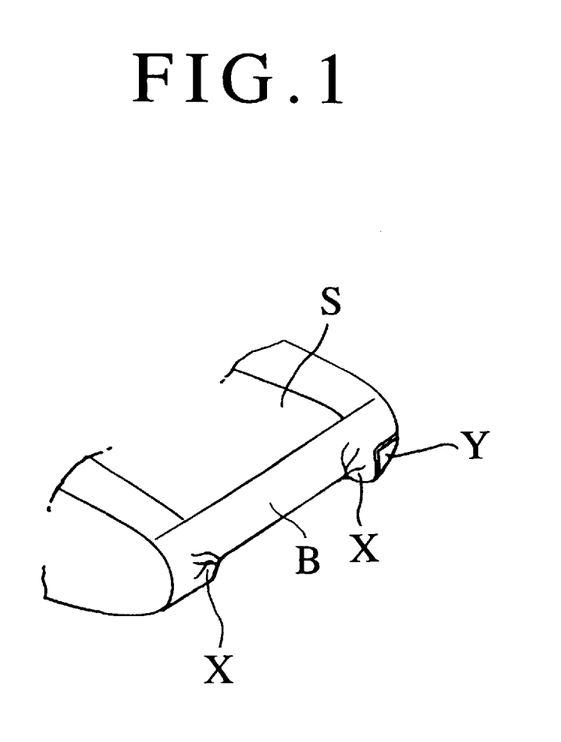
FIG. 1 is a schematic perspective view of a seat cushion of a conventional automotive seat.

Referring now to FIG. 1, a conventional automotive seat will be described hereinafter in order to facilitate understanding of the present invention. The conventional automotive seat comprises a seat back and a seat cushion. The seat cushion comprises a cushioned padding which is covered by a sheet S of covering material to which a back cover B of usual cloth such as a carpet is sewed. The covering sheet S is applied to the cushioned padding in such a manner that the back cover B covers a rear section of the cushioned padding.

When covering of the rear section of the cushioned padding by the back cover B of usual cloth such as a carpet is carried out in a manner to cause the back cover to match shapes of leg portions of the rear section of the cushioned padding and shapes of any internal devices attached to the cushioned padding, wrinkle X appears on the back cover B, resulting in detracting from the appearance of the seat cushion. Also, when a passenger sits on the seat cushion, there is a possibility that the back cover B will be drawn in a forward direction, resulting in a terminal section Y of the back cover B being easily turned up. In addition, if applying of the back cover B to the rear section of the cushioned padding is performed in a manner to cause the back cover B to match shapes of the leg portions of the rear section of the cushioned padding and shapes of any devices attached to the cushioned padding, it is impossible to ensure a satisfactory space around feet of a passenger who is to sit on a back seat.

In place of the back cover made from usual cloth such as a carpet, there has been proposed a back cover which is made of hard synthetic resin, e.g., polypropylene. When the back cover is to be made of hard synthetic resin, it is possible to form the back cover into a predetermined three-dimensional shape. However, a surface of the back cover is hard, so that if shoes of a passenger accidentally strike the back cover, the back cover will be damaged. In addition, when the shoes of the passenger strike the back cover, noise is produced. Similarly, when the back cover accidentally strike any internal devices attached to a cushioned padding, noise is produced. In order to avoid such noise, it is necessary to ensure any space between the back cover and the internal devices. In this case, the back cover is forced to project backwardly. Therefore, it is impossible to ensure a satisfactory space around feet of a passenger who is to sit on a back seat. Further, applying of the back cover to a rear section of the cushioned padding must performed after a sheet of covering is applied to the cushioned padding. Therefore, production of a seat cushion utilising the back cover requires many steps.

SUMMARY OF THE INVENTION

The present invention has been made with a view to overcoming the foregoing problems of the prior art automotive seats.

It is therefore an object of the present invention to provide an automotive seat in which a predetermined three-dimensional shape of a back cover for a cushioned padding of a seat cushion can be maintained.

It is another object of the present invention to provide an automotive seat which ensures a satisfactory space around leg portions of a rear section of a seat cushion of the automotive seat.

It is still another object of this invention to provide an automotive seat in which when, for example, shoes of a passenger accidentally strike a back cover covering a rear section of a cushioned padding of a seat cushion of the automotive seat, the back cover is not damaged and any noise is not produced.

It is yet another object of the present invention to provide an automotive seat in which wrinkle does not appear on a surface of a seat cushion of the automotive seat and turning-up of a terminal of a back cover covering a rear section of a cushioned padding of a seat cushion of the automotive seat does not occur.

It is still another object of the present invention to provide an automotive seat in which a back cover covering a rear section of a cushioned padding of a seat cushion of the automotive seat can resist any loads which may be applied to the back cover.

It is yet another object of the present invention to provide an automotive seat in which a back cover securely covers the entire rear section of a cushioned padding of a seat cushion of the automotive seat, and the back cover can be assembled to the cushioned padding at a stage of assembling of a covering sheet to the cushioned padding.

In accordance with the present invention, there is provided an automotive seat comprising a seat back and a seat cushion, the seat cushion having a cushioned padding, the cushioned padding covered at a rear section thereof by a back cover of a predetermined three-dimensional shape which is made from a sheet of fiber impregnated with thermoelastic synthetic resin.

The back cover may be laminated with a backing sheet of soft synthetic resin.

The back cover may be sewed at an edge of an upper region thereof to a sheet of covering for the cushioned padding, whereby the rear section of the cushioned padding can be covered by cooperation of the covering sheet and the back cover.

The back cover comprises an elongated body of a substantially C-shape in cross section, and first and second mounting sections which laterally project from both sides of the elongated body. The back cover is attached to first and second side covers for the cushioned padding with the mounting sections thereof being engaged with front surfaces of the first and second side covers.

Each of the first and second mounting sections of the back cover is formed with a through-hole. Each of the first and second side covers has a fastener projecting from a front surface of the side cover. The fastener comprises a substantially square-shaped body, and a substantially arrowhead-shaped portion provided at a tip end of the substantially square-shaped body and having a pair of laterally projecting stopper pawls. The back cover is securely attached to the side covers by causing the fasteners of the side covers to penetrate the through-holes of the first and second mounting sections of the back cover.

The back cover may be laminated with a sheet of hard felt, thereby causing the back cover to be reinforced.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denoted the same parts throughout the Figures and wherein.

DETAILED DESCRIPTION OF THE PREFERRED EMBODIMENT

Now, an automotive seat according to the present invention will be discussed hereinafter with reference to the accompanying drawings. The automotive seat comprises a seat cushion and a seat back.

Figure 2:
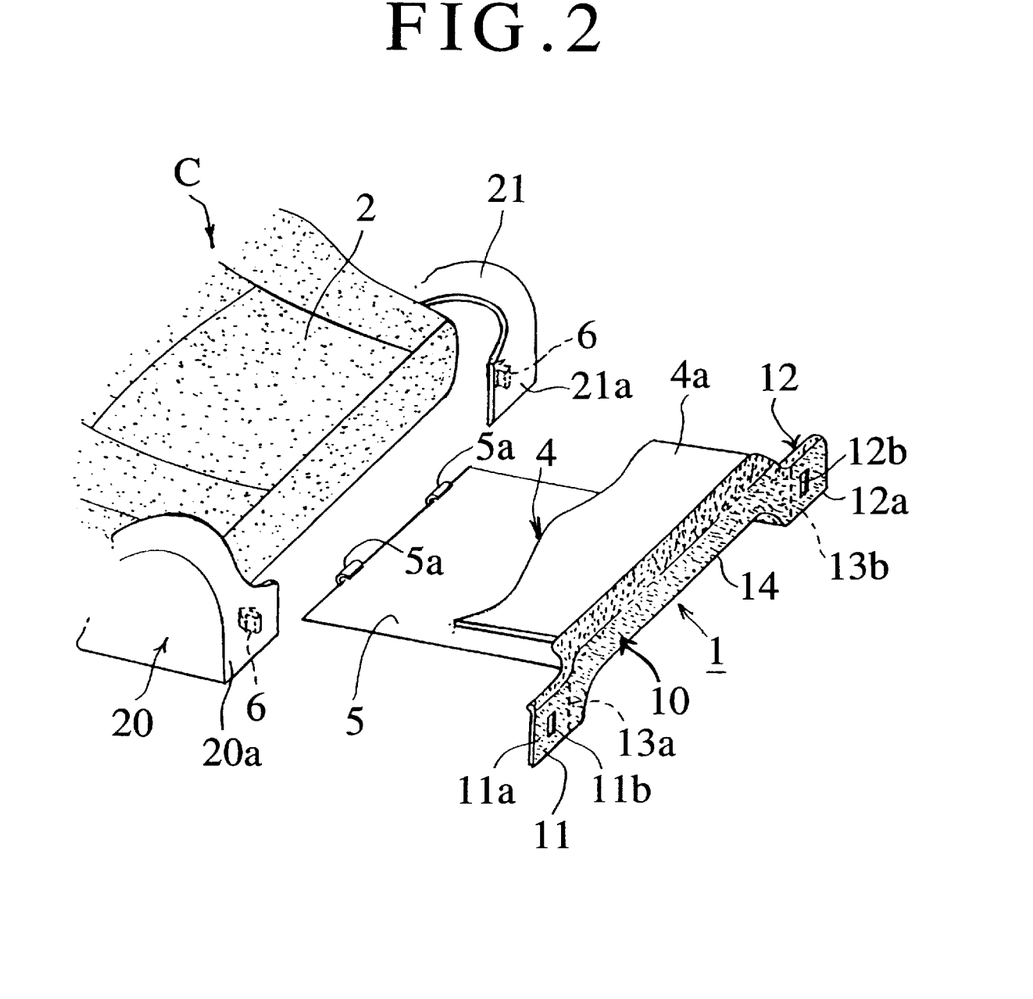
FIG. 2 is a schematic exploded perspective view of a seat cushion of an automotive seat according to an embodiment of the present invention.
Figure 3:
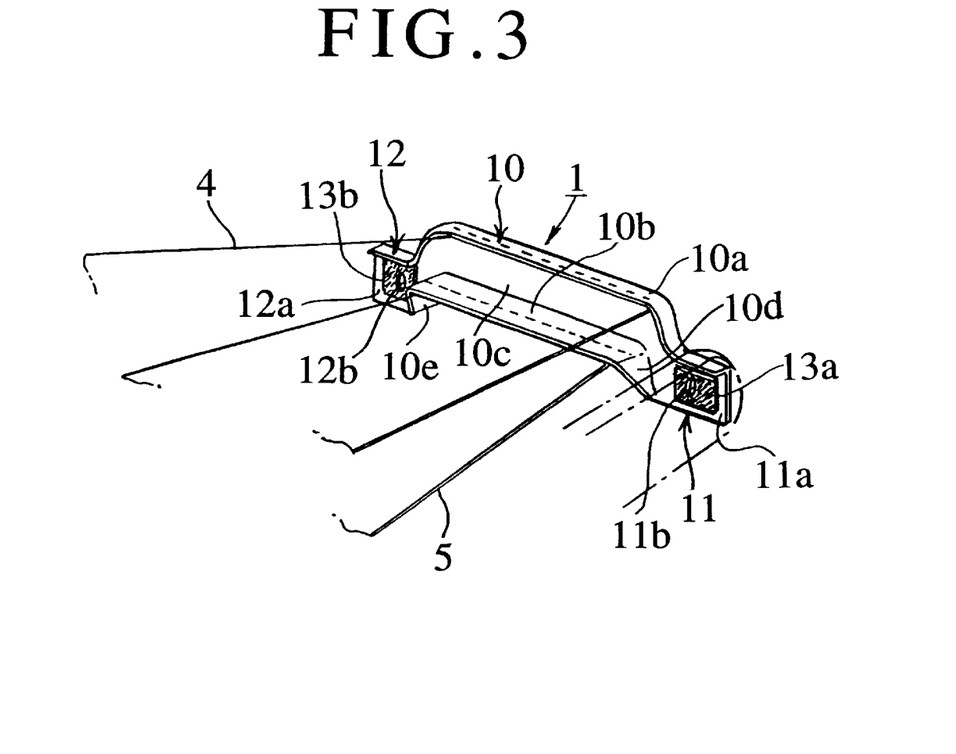
FIG. 3 a schematic perspective view of a back cover for covering a rear section of a cushioned padding for the seat cushion.
Figure 4:
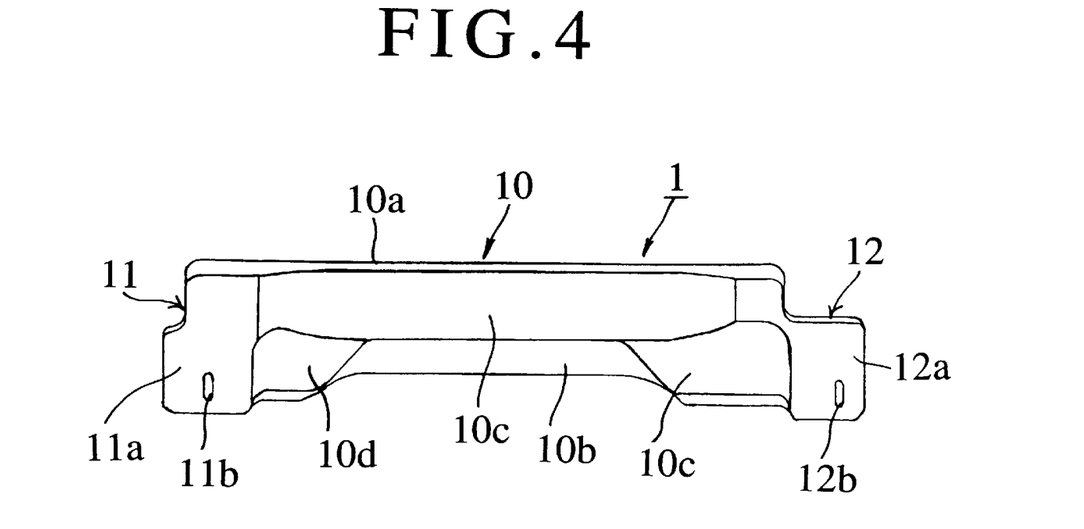
FIG. 4 is a schematic rear side view of the back cover of FIG. 3.

Referring to FIG. 2, there is illustrated a rear section of a seat cushion C for the automotive seat to which a back cover 1 is not assembled yet and which is in a disassembled state. In FIG. 2, reference numeral 2 denotes a cushioned padding for the seat cushion C, reference numerals 20, 21 designate side covers for covering both sides of the cushioned padding 2, reference numeral 4 denotes a sheet of covering material for covering the cushioned padding 2, reference numeral 4a designates a terminal section of the covering sheet 4, and reference numeral 5 designates an under cover for covering an underside of the cushioned padding 2. Incidentally, any devices which are to be attached onto the rear side and underside of the cushioned padding 2 are removed in FIG. 2 for clarity of illustration. Similarly, a seat back is removed from the seat cushion C in FIG. 2.

The back cover 1 is made by utilizing a so-called needle punched sheet of fiber impregnated with thermoelastic synthetic resin such as hard latex or the like. More particularly, the back cover 1 is produced by causing the needle punched sheet to be thermo-softened and press-forming it into a predetermined three-dimensional shape, which facilitates covering of the rear side of the cushioned padding 2, using male and female molds. Also, the back cover 1 may be made from a needle punched sheet with which a backing sheet of soft synthetic resin, such as polyethylene is laminated.

Figure 5:
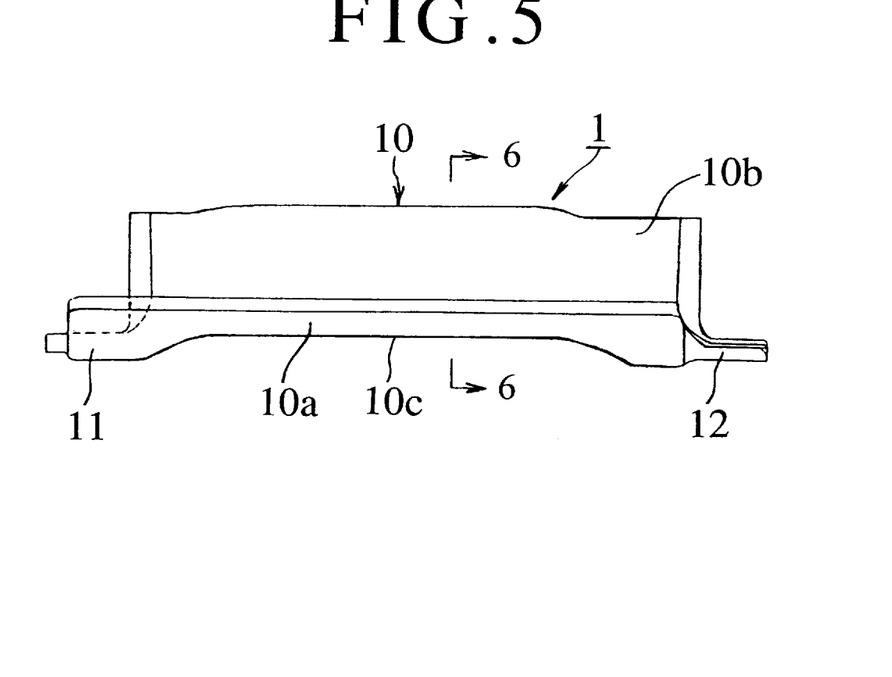
FIG. 5 is a schematic plane view of the back cover.
Figure 6:
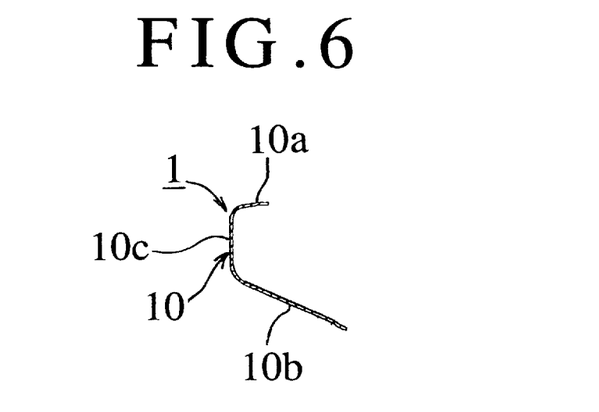
FIG. 6 is a schematic vertical sectional view of the back cover, taken on a plane indicated in FIG. 5 by a line 6—6.

Referring now to each of FIGS. 3–6, there is illustrated the back cover 1. The back cover 1 is formed into a three-dimensional shape as described above, and includes an elongated body 10 having a width which substantially corresponds in measure to that of the cushioned padding 2, and mounting sections 11, 12 projecting laterally from both sides of the elongated body 10. The elongated body 10 is formed into a substantially C-shape in section as shown in FIG. 6, and includes a top plate section 10a, a bottom plate section 10b, and a rear plate section 10c. As best shown in FIG. 5, the rear plate section 10c of the elongated body 10 is curved into a substantially circular arc shape at a middle region or its longitudinal direction in such a manner to be recessed forwardly as compared with the mounting sections, 11, 12. The back cover 1 further has a first ridge portion 10d interconnecting one end of the rear plate section 10c and one end of the bottom plate section 10b, and a second ridge portion 10e interconnecting the other end of the rear plate section 10c and the other end of the bottom plate section 10b. These ridge portions 10d, 10e serve as reinforcement means for a lower section of the back cover 1. The bottom plate section 10b is upwardly curved into a substantially arc-shape at a middle region of its longitudinal direction in order that a large space can be provided around feet of a passenger who is to sit on a back seat.

The first side cover 20 and second side cover 21 have a flat rear plate section 20a and a flat rear plate section 21a, respectively. The elongated body 10 of the back cover 1 is disposed between the first and second side covers 20, 21 with back surfaces of flat rear plate portions 11a, 12a of the mounting sections 11, 12 being applied onto front surfaces of the flat rear plate sections 20a, 21a of the side covers 20, 21. The flat rear plate portions 11a, 12a of the mounting sections 11, 12 are formed with through-holes 11b, 12b through each of which a fastener 6 of the side cover 20 (21) is to be fitted as will be discussed hereinafter in greater detail.

Any necessary elements can be attached to the back cover 1, which is made of the described-above material, by any suitable stitching method in the same manner as any necessary components are done to a conventional back cover which is made from a carpet or the like. More particularly, the covering sheet 4 is jointed to the back cover 1 by sewing the terminal section 4a of the covering sheet 4 to an edge of the top plate section 10a of the back cover 1. Also, the under cover sheet 5 is jointed to the back cover 1 by sewing a terminal section of the under cover sheet 5 to an edge of the bottom plate section 10b of the back cover 1.

Figure 7:
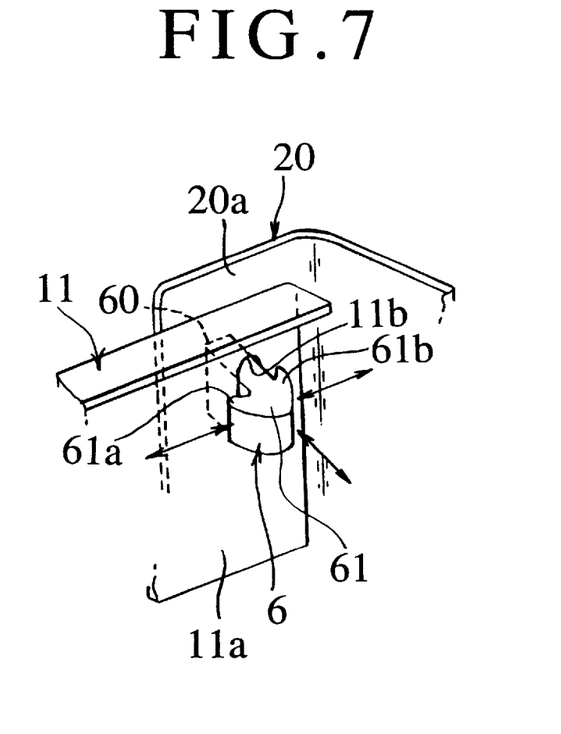
FIG. 7 is a schematic perspective view of assistance in explaining a state of the back cover being attached to a side cover.
Figure 8:
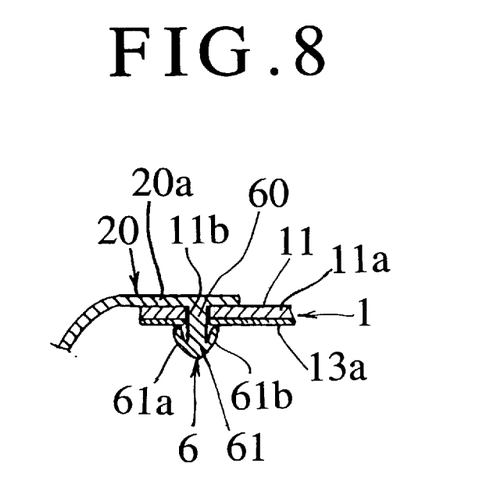
FIG. 8 is a schematic sectional view of assistance in explaining a state of the back cover being attached to the side cover.

Again referring to FIG. 2 and referring to FIGS. 7 and 8, the fasteners 6 are made of any suitable flexible material and project forwardly from the flat rear plate sections 20a, 21a of the side covers 20, 21. Each of the fasteners 6 includes a substantially square pole-shaped body 60, and a substantially arrowhead-shaped portion 61 provided at a tip end of the substantially square pole-shaped body 60 and having a pair of laterally projecting stopper pawls 61a, 61b. Bearing on this, each of the through-holes 11b, 12b of the mounting sections 11, 12 of the back cover 1 is formed into a substantially square-shape which substantially corresponds to a shape of the body 60 of the fastener 6 in cross-section. The back cover 1 is attached to the side covers 20, 21 by causing the fasteners 6 to be press-fitted through the through-holes 11b, 12b of the mounting sections 11, 12 of the back cover 1.

Again referring to FIG. 3, sheets 13a, 13b, e.g., needle punched sheets or sheets of hard felt such as worsted fabric are preferably attached onto front surfaces of the flat rear plates 11a, 12a of the mounting sections 11, 12 in a manner to surround the through-holes 11b, 12b of the mounting sections 11, 12, respectively. The sheets 13a, 13b serve as means to reinforce regions around the through-holes 11b, 12b of the mounting section 11, 12 of the back cover 1. Similarly, an outer surface of the back cover 1 and/or outer surfaces of the mounting sections 11, 12 may be laminated with a sheet 14, such as a needle punched sheet or a sheet of hard felt as shown in FIG. 2 in order to reinforce the outer surface of the back cover 1 and/or the outer surfaces of the mounting section 11, 12, if necessary.

Incidentally, the back cover 1 is attached to the side covers 20, 21 by applying the mounting sections 11, 12 onto the front surfaces of the flat rear plate sections 20a, 21a of the side covers 20, 21, and causing the fasteners 6 of the side covers 20, 21 to be press-fitted through the through-holes 11b, 12b of the mounting sections 11, 12 of the back cover 1. The back cover 1 is materially flexible, so that when the back cover 1 is to be attached to the side covers 20, 21, the back cover 1 can be easily disposed between the side covers 20, 21 arranged at the both sides of the cushioned padding 2, by causing the back cover 1 to be deformed in its width direction. After the back cover 1 is disposed between the side covers 20, 21, the mounting sections 11, 12 of the back cover 1 are secured to the side covers 20, 21 by causing the fasteners 6 of the side covers 20, 21 to be press-fitted through the through-holes 11b, 12b of the back cover 1. The press-fitting of the fasteners 6 into the through-holes 11b, 12b of the back cover 1 is easily performed while causing the laterally projecting pawls 61a, 61b of the arrowhead-shaped portions 61 to be deformed. When the press-fitting of the fasteners 6 through the through-holes 11b, 12b of the back cover 1 is completed, the laterally projecting stopper pawls 61a, 61b of the arrowhead-shaped portion 61 of each of the fasteners 6 are restored to the original state, resulting in the laterally projecting pawls 61a, 61b of the fastener 6 being positively engaged with a front surface of a corresponding mounting section of the back cover 1 in a manner not to separate the corresponding mounting section. Thus, the back cover 1 can be securely attached to the side covers 20, 21. Also, even if any loads are applied in any direction to the back cover 1, the substantially square pole-shaped body 60 of each of the fasteners 6 can resist the loads.

Figure 9:
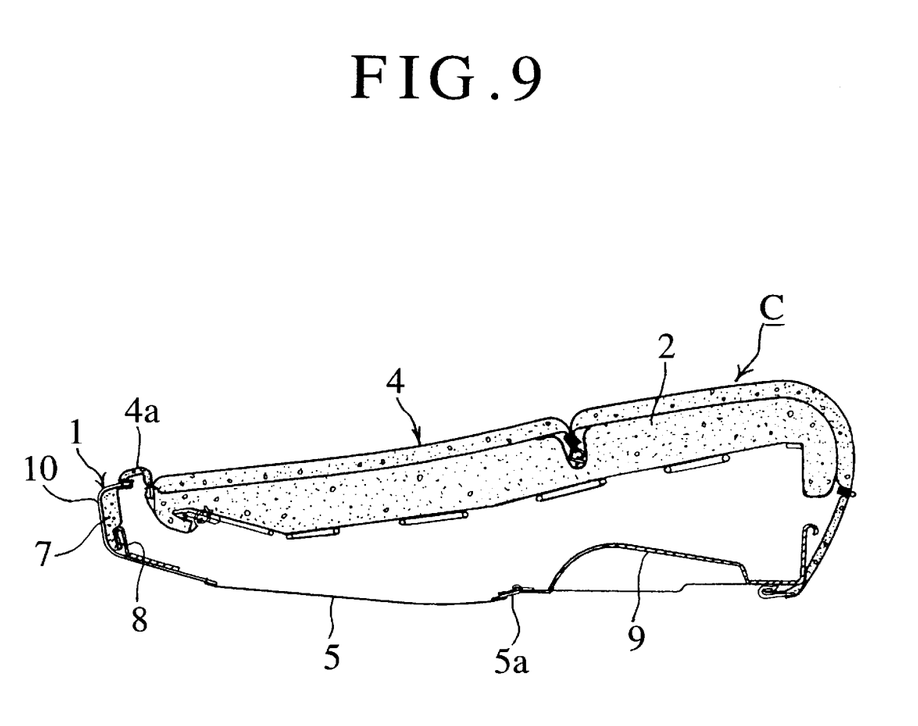
FIG. 9 is a schematic sectional view of the automotive seat in which the back cover is attached to the rear section of the cushioned padding.

Referring to FIG. 9, any suitable cushioned padding 7 is disposed between the elongated body 10 of the back cover 1 and a frame 8 attached onto an inner surface of the elongated body 10 of the back cover 1, so as to fill up an internal extra space of the back cover 1. Assembling of the back cover 1 to the cushioned padding 2 and assembling of the covering sheet 4 to the cushioned padding 2 can be performed at the same stage. The under cover sheet 5 can be attached to a bottom frame 9 of the seat cushion C through hook means 5a attached to a terminal portion of the under cover sheet 5, in a manner to be drawn in a forward direction by the hook means 5a.

In the automotive seat constructed as described above, the back cover 1 for the seat cushion C of the automotive seat is produced by causing a sheet of fiber to be impregnated with thermoelastic resin and forming it into a predetermined shape by male and female molds. Therefore, the back cover 1 can resist any tension which may generate when the seat cushion C is assembled and a passenger sits on the automotive seat. Also, the back cover 1 serves to reinforce the seat cushion C so as to keep a shape of the seat cushion C. In addition, the back cover 1 can be easily formed in a three-dimensional shape which substantially corresponds to that of the rear section of the seat cushion C. Further, the back cover serves to prevent any wrinkle from appearing on the surface of the seat cushion C, thus adding to the appearance of the seat cushion C and enhancing the value of the automotive seat. Also, the back cover 1 can be formed into a predetermined three-dimensional shape which allows to match that of any device attached to the seat cushion C.

In addition, the back cover facilitates achieving of efficient use of a space around a rear and lower section of the seat cushion C in a manner to ensure an enough space around feet of a passenger who is to sit on a back seat.

The back cover 1 is designed to provide some degree of strength which allows to keep a shape of the seat cushion C but allows a sewing needle to penetrate the back cover 1, so that the covering sheet 4 and the under cover sheet 5 can be attached to the back cover 1 by sewing. Therefore, assembling of the back cover 1 to the cushioned padding 2 can be performed at a stage of sewing of the covering sheet 4 and under cover sheet 5. Further, the back cover facilitates preventing generation of noise even if shoes of a passenger accidentally strike the back cover 1.

The back cover 1 is attached with respect to the side covers 20, 21 with the mounting sections 11, 12 thereof being applied onto the front surfaces of the flat rear plate sections 20a, 21a of the side covers 20, 21. Therefore, the back cover can cover the entire rear section of the cushioned padding 2 without leaving any clearance.

The back cover 1 is securely attached to the side covers 20, 21 by causing the fasteners 6 of the side covers 20, 21 to penetrate the through-holes 11b, 12b of the mounting sections 11, 12 of the back covers 20, 21, and causing the laterally projecting pawls 61a, 61b of the arrowhead-shaped portions 61 to be engaged with the front surfaces of the mounting sections 11, 12. Thus, the back cover 1 is securely supported at the mounting sections 11, 12 thereof by the substantially square-shaped bodies 60 of the fasteners 6. Therefore, the back cover 1 can resist any loads which may be applied in any direction to the back cover 1.

In addition, the mounting sections 11, 12 of the back cover 1 are reinforced by the sheets 13a, 13b of hard felt or the like, thus providing satisfactory mounting strength.

The term and expressions which have been employed are used as terms of description and not of limitation, and there is no intention in the use of such terms and expression of excluding any equivalents of the features shown and described, or portions thereof, but it is recognized that various modifications are possible within the scope of the invention claimed.

What is claimed is:

1. An automotive seat comprising:

a seat back; and a seat cushion;

said seat cushion having a cushioned padding, an externally exposed covering sheet of covering material covering a section of said cushioned padding except a rear section of said cushioned padding, and an externally exposed back cover covering said rear section of said cushioned padding and having a portion adapted to lie coplanar with said covering sheet;

said back cover formed separately from said covering sheet and formed into a predetermined three-dimensional shape;

said back cover made from a sheet of fiber impregnated with thermoelastic synthetic resin.

2. An automotive seat as defined in claim 1, wherein said back cover is laminated with a backing sheet of soft synthetic resin.

3. An automotive seat as defined in claim 2, wherein said covering sheet is jointed by a seam along a terminal section of said covering sheet to said back cover, so that said rear section of said cushioned padding is completely covered by cooperation of said covering sheet and said back cover.

4. An automotive seat as defined in claim 3, wherein said covering sheet comprises side covers covering both side sections of said cushioned padding, and wherein said back cover comprises an elongated body of a substantially C-shape in transverse cross-section and mounting sections projecting laterally from both sides of said elongated body, said back cover disposed between said side covers with said mounting sections thereof being engaged with front surfaces of said side covers.

5. An automotive seat as defined in claim 4, wherein each of said mounting sections of said back cover is formed with a through-hole and each of said side covers comprises a fastener having a body of a substantially square pole-shape projecting forwardly from a side cover and a substantially arrowhead-shaped portion provided at a tip end of said substantially square pole-shaped body, said back cover secured to said side cover by causing said fastener to be press-fitted through said through-pole.

6. An automotive seat as defined in claim 2, wherein said covering sheet comprises side covers covering both side sections of said cushioned padding, and wherein said back cover comprises an elongated body of a substantially C-shape in transverse cross-section and mounting sections projecting laterally from both sides of said elongated body, said back cover disposed between said side covers with said mounting sections thereof being engaged with front surfaces of said covers.

7. An automotive seat as defined in claim 6, wherein each of said mounting sections of said back cover is formed with a through-hole and each of said side covers comprises a fastener having a body of a substantially square pole-shape projecting forwardly from a side cover and a substantially arrowhead-shaped portion provided at a tip end of said substantially square pole-shaped body, said back cover secured to said side cover by causing said fastener to be press-fitted through said through-hole.

8. An automotive seat as defined in claim 1, wherein said covering sheet is jointed by a seam along a terminal section of said covering sheet to said back cover, so that said rear section of said cushioned padding is completely covered by cooperation of said covering sheet and said back cover.

9. An automotive seat as defined in claim 8, wherein said covering sheet comprises side covers covering both side sections of said cushioned padding, and wherein said back cover comprises an elongated body of a substantially C-shape in transverse cross-section and mounting sections projecting laterally from both sides of said elongated body, said back cover disposed between said side covers with said mounting sections thereof being engaged with front surfaces of said side covers.

10. An automotive seat as defined in claim 9, wherein each of said mounting sections of said back cover is formed with a through-hole and each of said side covers comprises a fastener having a body of a substantially square pole-shape projecting forwardly from a side cover and a substantially arrowhead-shaped portion provided at a tip end of said substantially square pole-shaped body, said back cover secured to said side cover by causing said fastener to be press-fitted through said through-hole.

11. An automotive seat as defined in claim 1 wherein said covering sheet comprises side covers covering both side sections of said cushioned padding, and wherein said back cover comprises an elongated body of a substantially C-shape in transverse cross-section and mounting sections projecting laterally from both sides of said elongated body, said back cover disposed between said side covers with said mounting sections thereof being engaged with front surfaces of said side covers.

12. An automotive seat as defined in claim 11, wherein each of said mounting sections of said back cover is formed with a through-hole and each of said side covers comprises a fastener having a body of a substantially square pole-shape projecting forwardly from a side cover and a substantially arrowhead-shaped portion provided at a tip end of said substantially square pole-shaped body, said back cover secured to said side cover by causing said fastener to be press-fitted through said through-hole.

13. An automotive seat as defined in claim 12, wherein said back cover is laminated with a sheet of hard felt serving as reinforcement means.

14. An automotive seat as defined in claim 11, wherein said back cover is laminated with a sheet of hard felt serving as reinforcement means.

* * * * *